United States Patent [19]

Moench et al.

[11] Patent Number: 5,290,880

[45] Date of Patent: Mar. 1, 1994

[54] PREPARATION OF FINELY DIVIDED, WATER-SOLUBLE POLYMERS CONTAINING VINYLAMINE UNITS

[75] Inventors: Dietmar Moench, Weinheim; Michael Kroener, Mannheim; Enrique Freudenberg, Schifferstadt; Heinrich Hartmann, Limburgerhof; Norbert Sendhoff, Gruenstadt, all of Fed. Rep. of Germany

[73] Assignee: BASF Aktiengesellschaft, Ludwigshafen, Fed. Rep. of Germany

[21] Appl. No.: 661,180

[22] Filed: Feb. 27, 1991

[30] Foreign Application Priority Data

Mar. 8, 1990 [DE] Fed. Rep. of Germany ....... 4007312

[51] Int. Cl.$^5$ ............................................. C08F 8/12
[52] U.S. Cl. ................... 525/369; 525/326.9; 525/327.4; 525/328.2; 525/329.4; 525/330.3; 525/355; 525/358
[58] Field of Search .............. 525/369, 355, 328.2, 525/358

[56] References Cited

U.S. PATENT DOCUMENTS

| | | | |
|---|---|---|---|
| 3,988,277 | 10/1976 | Witschonke | 525/375 |
| 4,421,602 | 12/1983 | Brunnmueller | 162/168.2 |
| 4,551,515 | 11/1985 | Herberg | 528/18 |
| 4,590,266 | 5/1986 | Yamashita | 536/69 |
| 4,623,699 | 11/1986 | Brunnmueller | 525/355 |
| 4,683,267 | 7/1987 | Lindner | 525/133 |
| 4,769,427 | 9/1988 | Nowakowsky | 526/64 |
| 4,798,871 | 1/1989 | Lai | 525/328.2 |
| 4,855,472 | 8/1989 | Burkhardt | 556/459 |
| 4,873,299 | 10/1989 | Nowakowsky | 526/73 |

FOREIGN PATENT DOCUMENTS 3715824 11/1987 Fed. Rep. of Germany .

OTHER PUBLICATIONS

Cram and Hammond, "Organic Chemistry", 1960, 275, McGraw-Hill.

*Primary Examiner*—Joseph L. Schofer
*Assistant Examiner*—F. Zitomer
*Attorney, Agent, or Firm*—Oblon, Spivak, McClelland, Maier & Neustadt

[57] ABSTRACT

N-vinylformamide is polymerized with or without other water-soluble monoethylenically unsaturated monomers and with or without water-insoluble monoethylenically unsaturated monomers in not less than 30% strength by weight aqueous monomer solutions in the presence of a polymerization initiator at not more than 150° C. in a kneader by a method in which the polymerization is carried out to such an extent that the initially formed water-containing polymer gel disintegrates into fine particles and the finely divided polymer obtainable in this manner is hydrolyzed, preferably in the kneader, so that not less than 0.1 mol % of the N-vinylformamide units present in the polymer are converted into vinylamine units. The polymers obtainable in this manner dissolve readily in water. The aqueous solutions are used, for example, in papermaking and tertiary oil production.

11 Claims, No Drawings

PREPARATION OF FINELY DIVIDED, WATER-SOLUBLE POLYMERS CONTAINING VINYLAMINE UNITS

German Laid-Open Application DOS 3,715,824 discloses a process for the preparation of finely divided, water-soluble polymers containing vinylamine units, in which process N-vinylformamide in the form of a 20–60% strength by weight solution is polymerized, the resulting gel is granulated, the gel particles formed are dispersed in methanol and the polymer dispersion obtained is brought into contact with an aqueous solution of an ammonium salt of a monobasic acid and with an acid, some of the N-vinylformamide groups present in the polymer being converted into vinylamine groups. The finely divided polymers can be isolated from the reaction mixture. They are readily water-soluble.

U.S. Pat. No. 4,769,427 discloses a process for the preparation of crosslinked, finely divided, gel-like polymers in single-screw mixers having a high degree of self-purging. In this process, monomer mixtures which contain from 0.01 to 5 parts by weight of a crosslinking agent per 100 parts by weight of from 50 to 100 mol % neutralized acrylic acid or methacrylic acid, acrylamide, methacrylamide or N-vinylpyrrolidone are polymerized in 20–65% strength by weight aqueous solution in the presence of polymerization initiators at from 45° to 95° C., and some of the water is removed under reduced pressure from the reaction mixture during the polymerization, so that a crumb-like gel having a solids content of from 30 to 70% by weight is discharged. The resulting crosslinked polymers are water-insoluble but absorb considerable amounts of water after drying.

It is an object of the present invention to provide a process for the preparation of finely divided, water-soluble polymers containing vinylamine units, in which process it is possible to dispense with the use of organic diluents during the hydrolysis step, so that the pulverulent powders are obtainable in a technically simpler manner.

We have found that this object is achieved, according to the invention, by a process for the preparation of finely divided, water-soluble polymers containing vinylamine units by polymerizing a) N-vinylformamide with or without
b) other water-soluble monoethylenically unsaturated monomers and with or without
c) water-insoluble monoethylenically unsaturated monomers in concentrated aqueous solutions in the presence of a polymerization initiator, and hydrolyzing not less than 0.1 mol % of the N-vinylformamide units present in the polymer to give vinylamine units, if not less than 30% strength by weight aqueous monomer solutions are polymerized in kneaders to such an extent that the initially formed water-containing polymer gel disintegrates into fine particles and the finely divided polymer obtainable in this manner is hydrolyzed.

The preparation of the pulverulent polymers is carried out in two stages. In the first stage of the process, a) N-vinylformamide is polymerized either alone to give homopolymers or, if required, with b) other water-soluble monoethylenically unsaturated monomers to give copolymers. In the present case, water-soluble monomers are all monomers which have a solubility of not less than 1% by weight in water at 20° C. If the solubility of the monomers in water is less than 1% by weight, they are regarded as water-insoluble.

Other suitable water-soluble monoethylenically unsaturated monomers are, for example, monoethylenically unsaturated $C_3$–$C_8$-carboxylic acids, such as acrylic acid, methacrylic acid, dimethacrylic acid, ethacrylic acid, maleic acid, citraconic acid, methylenemalonic acid, allylacetic acid, vinylacetic acid, crotonic acid, fumaric acid, mesaconic acid and itaconic acid. These monomers are subjected to the polymerization either in the form of the free acids or in a form completely or partially neutralized with alkali metal bases or ammonia. Other monomers of group b) are, for example, acrylamide, methacrylamide, acrylamidopropanesulfonic acid, vinylsulfonic acid, vinylphosphonic acid, hydroxyalkyl acrylates and hydroxyalkyl methacrylates, such as hydroxymethyl acrylate, hydroxypropyl acrylate, hydroxybutyl acrylates, hydroxyethyl methacrylate, hydroxypropyl methacrylate, hydroxybutyl methacrylates or mixtures of the stated compounds. Other suitable monomers of group b) are the alkylaminoalkyl acrylates and methacrylates, e.g. dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate or mixtures of the stated basic acrylates and methacrylates and the salts of the stated compounds with mineral acids or organic acids or the quaternization products of these basic acrylates and methacrylates with alkyl halides, e.g. methyl chloride, ethyl chloride, benzyl chloride and lauryl chloride, and the quaternization products with dimethyl sulfate and diethyl sulfate. Further suitable monomers of group b) are N-vinylpyrrolidone, vinylpyridinium salts and diallyldimethylammonium halides, such as diallyldimethylammonium chloride and diallyldiethylammonium chloride. If the monomers of group b) are used in the copolymerization, they may be present in the monomer mixture in an amount of from 1 to 99, preferably from 1 to 50, mol %.

N-vinylformamide may be modified only with monomers of group c). Monomers of group c) are water-insoluble monomers, for example acrylates and methacrylates, e.g. methyl acrylate, ethyl acrylate, n-butyl acrylate, 2-ethylhexyl acrylate, isobutyl methacrylate, methyl methacrylate, dimethyl maleate, dimethyl fumarate, dimethyl itaconate, acrylonitrile, methacrylonitrile, vinyl acetate and vinyl propionate. The monomers of group c) are used only in an amount such that the resulting copolymers are still water-soluble. The amount of the monomers of group c) in the monomer mixture is not more than 50 mol %. The monomers of group c) can also be used together with the monomers of group b) for the preparation of copolymers of N-vinylformamide; for example, mixtures of N-vinylformamide, N-vinylpyrrolidone and methyl acrylate or mixtures of N-vinylformamide, vinyl acetate and methyl acrylate may be subjected to the copolymerization. The preparation of homopolymers of N-vinylformamide and the preparation of copolymers of N-vinylformamide with acrylamide, N-vinylpyrrolidone, acrylic acid and/or vinyl acetate are particularly preferred.

The polymerization of the monomer mixtures described above is carried out in not less than 30% strength by weight aqueous monomer solutions in kneaders. The pH of the aqueous monomer solutions is usually from 5 to 8, preferably from 6 to 7. In order to keep the pH very constant during the polymerization, the latter may be carried out in the presence of a conventional buffer system, e.g. sodium acetate. The concentration of the monomers in the aqueous solution may be up to 90% by weight and is preferably from 60 to 85% by weight. The polymerization is carried out under inert gas, e.g. nitrogen, in the presence of a polymerization initiator which forms free radicals under the polymerization conditions. Examples of suitable initiators are hydrogen peroxide, alkali metal and ammonium salts of peroxydisulfuric acid, peroxides, hydroperoxides, redox catalysts and in particular nonoxidizing initiators, such as azo compounds which decompose into free radicals. Water-soluble azo compounds, such as 2,2'-azobis-(2-amidinopropane) dihydrochloride, 2,2'-azobis-(N,N'-dimethyleneisobutyramidine) dihydrochloride or 2,2'-azobis-[2-methyl-N-(2-hydroxyethyl)-propionamide), are preferably used. It is of course also possible to use mixtures of different initiators. The polymerization initiators are used in conventional amounts, for example in amounts of from 0.01 to 5% by weight, based on the monomers to be polymerized.

If polymers having low molecular weights are desired, it is possible, for example, to increase the amounts of initiator which are usually used in the polymerization so that they are outside the range stated above for the amounts of the initiator. Low molecular weight copolymers can also be obtained by carrying out the polymerization in the presence of a polymerization regulator or using a polymerization regulator and larger amounts of initiators than usually required. Examples of suitable polymerization regulators are dodecyl mercaptan, thioglycolic acid, thioacetic acid and mercapto alcohols, such as mercaptoethanol, mercaptopropanols and mercaptobutanols.

The polymerization of the monomers described above is preferably carried out with evaporative cooling at from 20 mbar to atmospheric pressure and at not more than 100° C., preferably from 25° to 80° C. However, the polymerization can also be effected at superatmospheric pressure, e.g. 5 atm, and at not more than 150° C. The pH of the aqueous monomer solution is usually from 5 to 8, preferably from 6 to 7. The viscosity of the monomer solution increases very sharply as the polymerization progresses, so that the initially obtained water-containing polymer gel disintegrates into fine particles in the further course of the polymerization.

Owing to the sharp increase in viscosity during the polymerization, it is necessary to carry out the polymerization in mixing apparatuses in which the reactants can still be thoroughly mixed, even in the form of the aqueous polymer gel. Examples of suitable mixing apparatuses of this type are mixers, preferably those which have a high degree of self-purging. The degree of self-purging of the suitable mixing apparatuses is above 80%. Suitable apparatuses of this type are described in, for example, Chemie-Ingenieur-Technik, 57 (1985), 1005. These apparatuses are preferably single-screw kneaders or suitably designed extruders.

The homopolymerization of the N-vinylformamide and the copolymerization of the N-vinylformamide with the monomer b) and, if required, c) can be particularly advantageously carried out in the apparatus described in the abovementioned U.S. Pat. No. 4,769,427. This is a single-screw cylindrical mixer on whose stirrer shaft disk segments are arranged which have, on the outer end, mixing bars in an arrangement such that thorough circulatory mixing of the substances introduced into the mixer is effected as a result. The single-screw cylindrical mixer has a length/diameter ratio of from 3:1 to 20:1. The disk segments are arranged in a propeller-like form on the stirrer shaft. From 2 to 25 of these disk segments are distributed over the entire length of the stirrer shaft, a disk segment consisting of from 2 to 7 individual elements which are arranged in propeller-like form. The mixing elements which are located at the outer end of the disk segments transport the mixture in the stage of polymerization inside the mixing apparatus and simultaneously prevent the polymer gel from being deposited on the internal wall of the mixer, because the mixing segments pass close to the internal wall of the cylindrical mixer. Examples of suitable mixing elements are mixing bars which pass close to the wall or plowshare-like attachments. The mixer also contains built-in counter-hooks with a flange in order to remove the gel formed in the polymerization from the disk segments of the stirrer shaft and from the mixing bars.

The polymerization can be carried out continuously or batchwise.

Prepolymerization in a suitable upstream reactor, from which the partially polymerized reaction mixture is then fed to the kneader, is also possible. This procedure is particularly advisable in the continuous polymerization on an industrial scale, in order to keep the residence time in the kneader as short as possible.

During the polymerization, it is preferable not to remove water from the system, so that the resulting polymer gel has a solids content of from 30 to 90%, preferably from 60 to 85%, and its solids content remains virtually unchanged during the polymerization. However, the polymerization can also be carried out by a method in which the heat of polymerization is removed during the reaction by distilling off water from the reaction mixture. The polymerization is started, for example, at a solids content of 60% by weight, and a crumb-like gel having a solids content of 75% by weight is obtained at the end. In the course of the polymerization, the polymer gel disintegrates into fine particles. As soon as the polymer gel has disintegrated into particles having a size of about 1-5 mm, a sharp reduction in the energy consumption of the stirrer for thorough mixing of the reactants is found for batchwise polymerization. As soon as the energy consumption required for thorough mixing decreases sharply, not less than 80% of the monomers have been polymerized. The polymerization generally takes from 0.5 to 3 hours. It can be carried out both batchwise and continuously. Polymers having Fikentscher K values of from 100 to 300, preferably from 140 to 300, are obtained. The water-containing polymer gel initially formed in the polymerization disintegrates particularly rapidly into individual particles if one or more surfactants are added before, during or, preferably, after a monomer conversion of 80% or more or after the maximum reaction temperature has been reached in adiabatic polymerization. From 0.1 to 10, preferably from 0.5 to 5, % by weight, based on the monomers used in the polymerization, of surfactants are employed.

All surfactants which have an HLB value of not less than 3 are suitable for this purpose (for the definition of the HLB value, see W. C. Griffin, J. Soc. Cosmetic Chem. 5 (1954), 249). Examples of suitable nonionic surfactants are the adducts of ethylene oxide, propylene oxide or mixtures of ethylene oxide and propylene oxide with alkylphenols, aliphatic alcohols, carboxylic acids and amines. For example $C_8$-$C_{12}$-alkylphenols, alkoxylated with ethylene oxide and/or propylene oxide are suitable. Commercial products of this type are, for example, octylphenols and nonylphenols, each of which have been reacted with from 4 to 20 moles of ethylene oxide per mole of phenol. Other nonionic surfactants are ethoxylated $C_{10}$-$C_{24}$-fatty alcohols or ethoxylated $C_{10}$-$C_{24}$-fatty acids and ethoxylated $C_{10}$-$C_{24}$fatty amines or ethoxylated $C_{10}$-$C_{24}$-fatty amides. Polyhydric $C_3$-$C_8$-alcohols partially esterified with $C_{10}$-$C_{24}$-fatty acids are also suitable. These esters may additionally be reacted with from 2 to 20 moles of ethylene oxide. Suitable fatty alcohols which are alkoxylated for the preparation of the surfactants are, for example, palmityl alcohol, stearyl alcohol, myristyl alcohol, lauryl alcohol, oxo alcohols and unsaturated alcohols, such as oleyl alcohol. The fatty alcohols are ethoxylated or propoxylated, or reacted with ethylene oxide and propylene oxide, to an extent where the reaction products are soluble in water. In general, 1 mole of the above-mentioned fatty alcohols is reacted with from 2 to 20 moles of ethylene oxide and, if required, not more than 5 moles of propylene oxide so that the resulting surfactants have an HLB value of more than 8.

$C_3$-$C_8$-alcohols which as starting materials for the preparation of the surfactants are partially esterified and, if required, ethoxylated are, for example, glycerol, sorbitol, mannitol and pentaerythritol. These polyhydric alcohols are partially esterified with $C_{10}$-$C_{24}$-fatty acids, e.g. oleic acid, stearic acid or palmitic acid. Esterification with the fatty acids is carried out at most to such a degree that one or more OH groups of the polyhydric alcohol remain unesterified. Examples of suitable esterification products are sorbitan monooleate, sorbitan tristearate, mannityl monooleate, glyceryl monooleate and glyceryl dioleate. The stated fatty esters of polyhydric alcohols, which still contain one or more free OH groups, may furthermore be modified by reaction with ethylene oxide, propylene oxide or mixtures of ethylene oxide and propylene oxide. Preferably from 2 to 20 moles of the stated alkylene oxide are used per mole of fatty ester. The degree of ethoxylation is known to have an effect on the HLB value of the nonionic surfactants. By a suitable choice of the alkoxylating agent and of the amount of alkoxylating agent, it is possible to prepare surfactants having HLB values of from 3 to 20 in a technically simple manner.

Another group of suitable substances are homopolymers of ethylene oxide, block copolymers of ethylene oxide and alkylene oxides, preferably propylene oxide, and polyfunctional block copolymers which are formed, for example, by sequential addition of propylene oxide and ethylene oxide with dismines.

The nonionic surfactants can be used either alone or as a mixture with one another. There are many possible variations here; for example, surfactants having a different degree of ethoxylation or alkoxylated phenols can be used together with ethoxylated fatty alcohols or ethoxylated fatty alcohol derivatives. Further suitable surfactants are $C_8$-$C_{24}$-alkylsulfonates, which are preferably used in the form of the alkali metal salts, $C_8$-$C_{24}$-alkylsulfates, which are preferably employed in the form of the alkali metal or trialkanolammonium salts, sulfosuccinic diesters, for example the sodium salt of di-2ethylhexyl sulfosuccinate, half-esters of sulfosuccinic acid, for example the disodium salt of ricinoleic acid/monoethanolamidosulfosuccinic acid or disodium fatty alcohol polyglycol ether sulfosuccinate, $C_8$-$C_{24}$-alkylarylsulfonic acids, for example the disodium salt of dodecyloxydiphenyl disulfonic acid, and the sulfuric half-esters of adducts of ethylene oxide with alkylphenols or fatty alcohols. Examples of suitable cationic surfactants are the adducts of alkylene oxides with fatty amines or salts of fatty amines, for example pentaoxyethylstearylammonium acetate or ethoxylated methyloleylamine methosulfate, and long-chain alkylbenzyldimethylammonium compounds, such as $C_{10}$-$C_{22}$-alkylbenzyldimethylammonium chloride. Other suitable cationic surfactants are the salts of fatty amines, for example coconut fatty ammonium acetate, quaternary fatty aminoesters, for example di-fatty acid isopropyl ester dimethylammonium methosulfate, and quaternary fatty aminoamides, for example N-undecylenoic acid propylamido-N-trimethylammonium methosulfate. Amphoteric surfactants, for example those which carry one or more quaternary ammonium cations and one or more carboxylate or sulfonate anions in the same molecule, are also suitable. Commercial products of this type are, for example, dimethylcarboxymethyl fatty alkylamidoammonium betaines or 3-(3-fatty acid amidopropyl)-dimethylammonium 2-hydroxypropanesulfonates. The ionic surfactants can be used alone or as a mixture with one another, provided that the surfactant mixture does not lead to a precipitation of the surfactants in water.

If surfactants are added, preferably only up to 50% of the amount of surfactants are added in the monomer solution and the remainder of the suitable amount of surfactants is added to the resulting polymer gel after the maximum polymerization temperature has been reached when the polymerization has been carried out adiabatically. The conversion of the monomers in this case is not less than 80%. Particularly finely divided polymers are also obtained when the total amount of surfactant is added to the prepared, still polymerizing polymer gel after a monomer conversion of not less than 80% has been reached.

The polymer powders obtainable in this manner are particularly finely divided and dissolve rapidly in water. The polymer powders which still contain water, can, if required, be dried and then hydrolyzed. Preferably, the polymer powders still containing water are subjected to the second process stage, i.e. hydrolysis, in the kneader. The polymers obtained in the first stage of the novel process contain N-vinylformamide units of the formula

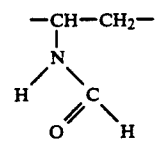  (I)

which are converted into units of the formula

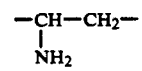  (II)

by hydrolysis. Depending on the amount of water present in the polymer particles and on the reaction conditions in the hydrolysis, i.e. the amount of acid or base, based on the polymer to be hydrolyzed, and on the reaction temperature during the hydrolysis, the units of the formula I in the polymers are either partially or completely hydrolyzed. The hydrolysis of the polymers is continued until from 0.1 to 100%, preferably from 10 to 90%, of the monomer units of the formula I which are present in the polymers have been hydrolyzed. The hydrolysis is carried out at from 20° to 100° C., preferably from 30° to 70° C.

To carry out hydrolysis, an acid or base is added to the initially prepared polymer powders. Examples of acids which are suitable for the hydrolysis are mineral acids, such as hydrogen halides (gaseous or in aqueous solution), sulfuric acid, nitric acid or phosphoric acid (ortho- or metapolyphosphoric acid), and organic acids, for example $C_1$-$C_5$-carboxylic acids, such as formic acid, acetic acid and propionic acid, or the aliphatic or aromatic sulfonic acids, such as methanesulfonic acid, benzenesulfonic acid or toluenesulfonic acid. Hydrochloric acid or sulfuric acid is preferably used for the hydrolysis. For this purpose, in general from 0.05 to 1.5, preferably from 0.4 to 1.2, equivalents of acid or base are required per equivalent of formyl groups in the polymer.

In the hydrolysis with bases, hydroxides of metals of the first and second main groups of the Periodic Table can be used, for example lithium hydroxide, sodium hydroxide, potassium hydroxide, calcium hydroxide, strontium hydroxide and barium hydroxide are suitable. However, it is also possible to use ammonia and alkyl derivatives of ammonia, for example alkyl- or arylamines, such as triethylamine, monoethanolamine, diethanolamine, triethanolamine, morpholine or aniline. Ammonia, sodium hydroxide solution and potassium hydroxide solution are preferably used as bases for the hydrolysis.

In order to avoid crosslinking during the hydrolysis of the polymers, hydrolysis is preferably carried out in the presence of aldehyde acceptors. For this purpose, one or more aldehyde acceptors are added, either before or during the hydrolysis, to the polymer particles to be hydrolyzed. Examples of said acceptors are reducing compounds, such as sodium sulfite, sulfur dioxide, sodium dithionite, hydroxylamine, phenylhydrazine or hydrazine, and aldehyde acceptors which are known to bind aldehydes, such as urea, ethyleneurea, propyleneurea, melamine, guanidine, aminoguanidine or mixtures thereof. The compounds which act as aldehyde acceptors are used in amounts of from 0.1 to 10, preferably from 0.5 to 5, % by weight, based on the polymers.

The use of sulfur dioxide as an aldehyde acceptor is of particular industrial interest because it is very effective and can be readily distributed in the reaction mixture.

After the hydrolysis, finely divided, gel-like polymers are obtained and can, if desired, be dried. The drying step can be carried out, for example, in the kneader in which the polymerization was effected, or in known drying apparatuses, for example on a through-circulation drying belt or a vacuum drying belt or in a fluidized bed or a paddle drier. The water can also be removed from the polymer particles by means of microwave drying. The drying step is preferably carried out under reduced pressure, for example at 5 to 1,000, preferably from 20 to 800, mbar and at from 30° to 170° C.

After the drying procedure, a free-flowing polymer gel, which may be comminuted in a conventional apparatus, for example milled to a finer particle size, is obtained. It is also possible for the crumb-like polymer gels which are obtained in the first process step and generally have particle sizes of from 0.1 to 5 mm to be further comminuted or to be brought to a uniform particle size. This comminution may be carried out, for example, with the aid of suitable separating units. It is also possible to comminute the hydrolyzed, water-containing, non-dried polymer gel on a conventional apparatus, if necessary. The finely divided, partially or completely hydrolyzed polymers can also be conditioned directly with inert pulverulent solids. This comprises both dusting and mixing with relatively large amounts of inert solids. The solids may include both organic and inorganic inert materials. Suitable finely divided inorganic solids are, for example, chalk, silica (e.g. Aerosil®), kaolin, titanium dioxide, talc, bentonite, montmorillonite or mixtures of these substances. Among the inorganic inert solids, bentonite is preferably used. If the hydrolyzed pulverulent polymers are treated with inorganic solids, the amount of solids is from 0.1 to 50, preferably from 0.5 to 10, % by weight, based on the polymers. The hydrolyzed polymer particles which have been conditioned with inorganic solids are dry to the touch and do not cake even on prolonged storage. The hydrolyzed, water-containing polymer particles conditioned in this manner are relatively rapidly soluble in water, since the polymers are in a relatively highly swollen state. The finely divided, hydrolyzed polymers can, however, also be conditioned with organic inert materials, for example with carboxymethylcellulose, starch, polyvinylpyrrolidone and polyalkylene oxides. The organic inert materials are used in amounts of from 0.1 to 50% by weight, based on the polymers. They too cause the hydrolyzed polymer particles to dissolve readily in water.

The polymers containing vinylamine units and obtained by the novel process can be used for all purposes for which polymers containing vinylamine units and obtainable by other methods are also used, for example as a drainage aid, retention aid and flocculant in papermaking, as a flocculant for wastewater, in the dewatering of sewage sludge, as a flocculant in ore dressing and in tertiary oil production. The polymers obtainable by the novel process can also be used as a fixative in the production of paper from paper stocks containing foreign substances. In papermaking for example these polymers are found, surprisingly, to have a higher drainage rate and improved retention compared with copolymers of similar structure and K value prepared for example by the emulsion polymerization process. The polymers obtainable by the novel process can also be used as agents for increasing the strength of paper and as raw materials for adhesives.

In the Examples which follow, percentages are by weight. The K value of the polymers was measured according to H. Fikentscher, Cellulose-Chemie, 13 (1932), 48-64 and 71-74, at a polymer concentration of 0.1% by weight in 5% strength aqueous sodium chloride solution at 25° C.; $K = k \cdot 10^3$.

EXAMPLE 1

A mixture of 144 g of N-vinylformamide, 0.17 g of tetrasodium ethylenediaminetetraacetate, 0.55 g of 2,2'-azobis-(2-amidinopropane) dihydrochloride and 95 g of water is introduced into a single-screw kneader which has a capacity of 700 ml and is equipped with a reflux condenser. The wall temperature of the kneader is 60° C. and the internal pressure is 200 mbar. The speed of the stirrer shaft is 70 revolutions per minute. The course of the polymerization can be monitored via the increase in the viscosity of the reaction mixture and hence via the increase in the power consumption of the stirrer. In the course of 30 minutes, the internal temperature increases to 62° C., the refluxing intensity being at a maximum. The originally cohesive polymer gel then disintegrates into small particles within a few minutes. At the same time, the power consumption of the stirrer, which had been increasing up to this time, decreases to the value measured before the beginning of the polymerization during stirring of the monomer solution having virtually the same viscosity as water.

The reaction mixture is stirred for a further 3 hours at 60°-62° C., the pressure is equilibrated with the atmosphere and a polymer sample is taken. Analysis of the sample shows that it consists of crumb-like particles having a mean particle size of from 2 to 3 mm. The polymer has a solids content of 60.3% and a K value of 198. The conversion is 99.8%.

In the second stage, the hydrolysis is carried out by a procedure in which 28.1 g of 85% strength by weight sulfuric acid are added dropwise, at 40° C. in the course of 10 minutes, to the 235 g of polymer present in the kneader. The mixture is then heated to 60° C. It is allowed to continue reacting for 2 hours at 60° C., after which 8.0 g of gaseous ammonia are introduced. The mixture is then allowed to cool, and 265 g of partially hydrolyzed crumb-like polymer having a particle diameter of from 2 to 3 mm are removed from the reactor after the latter has been opened. The degree of hydrolysis is 15.8%, determined by polymer titration and enzymatic formic acid determination.

EXAMPLES 2 TO 4

Homopolymers of N-vinylformamide are prepared under the reaction conditions stated in Table 1, by the method described in Example 1.

Hydrolysis is carried out similarly to Example 1. The details are given in Table 2.

If 4.5 g of bentonite are added per 100 g of polymer after the end of the neutralization, the initially crumb-like bulky product collapses and forms spherical, non-tacky and packable granules.

TABLE 1

| Example No. | VFA [g] | Water [g] | Initiator [g] | WT [°C.] | Tmax [°C.] | P [mbar] | SS [rpm] | SC [%] | K value | C [%] |
|---|---|---|---|---|---|---|---|---|---|---|
| 2 | 144 | 95 | 0.55 | 60 | 62 | 200 | 25 | 60.3 | 190 | 99.6 |
| 3 | 168 | 71 | 0.64 | 60 | 62 | 200 | 70 | 70.2 | 215 | 99.8 |
| 4 | 119 | 120 | 0.46 | 50 | 51 | 100 | 70 | 49.8 | 198 | 99.1 |

WT: Wall temperature of the kneader
$T_{max}$: Maximum reaction temperature
P: Internal pressure
SS: Stirrer speed
SC: Solids content
C: Conversion

TABLE 2

| Example No. | T [°C.] | Acid | Acid conc. [% by wt.] | Amount of acid [g] | NH3 [g] | Degree of hydrolysis [%] |
|---|---|---|---|---|---|---|
| 2 | 60 | $H_2SO_4$ | 85 | 28.1 | 8.0 | 15.5 |
| 3 | 60 | HCl | 100 | 18.0 | 3.4 | 18.5 |
| 4 | 60 | $H_2SO_4$ | 85 | 46.9 | 13.3 | 32.6 |

T: Hydrolysis temperature

EXAMPLES 5 TO 10

The monomers shown in Table 3 are copolymerized similarly to the method stated in Example 1. The K values of the copolymers and the solids contents of the polymer gels are also shown in Table 3. Hydrolysis of the copolymers was carried out under the conditions stated in Table 4, similarly to Example 1, in a kneader.

TABLE 3

| Example No. | VFA [g] | AM 50% [g] | VP [g] | VAc [g] | Water [g] | Initiator [g] | WT [g] | P [mbar] | $T_{max.}$ [°C.] | $t_d$ [min] | SC [%] | K value |
|---|---|---|---|---|---|---|---|---|---|---|---|---|
| 5 | 107 | 24 | — | — | 108 | 0.46 | 60 | 200 | 61 | 30 | 49.8 | 184 |
| 6 | 83 | 71 | — | — | 85 | 0.46 | 60 | 200 | 62 | 27 | 49.8 | 181 |
| 7 | 59 | 120 | — | — | 60 | 0.46 | 60 | 200 | 65 | 20 | 49.8 | 206 |
| 8 | 36 | 167 | — | — | 36 | 0.46 | 60 | 200 | 69 | 5 | 49.8 | 233 |
| 9 | 95 | — | 37 | — | 120 | 0.46 | 60 | 200 | 62 | 70 | 52.4 | 156 |
| 10 | 130 | — | — | 38 | 72 | 0.64 | 60 | 400 | 67 | 75 | 70.0 | 141 |

VFA: N-vinylformamide
AM: Acrylamide
VP: N-vinylpyrrolidone
VAc: Vinyl acetate
WT: Wall temperature of the kneader
P: Internal pressure
$T_{max}$: Maximum reaction temperature
$t_d$: Time after which disintegration of the gel occurs
SC: Solids content

TABLE 4

| Example No. | T [°C.] | Acid | Acid conc. [% by wt.] | Amount of acid [g] | NH3 [g] | Degree of hydrolysis [%][1] |
|---|---|---|---|---|---|---|
| 5 | 60 | $H_2SO_4$ | 85 | 28.1 | 8.0 | 21.0 |
| 6 | 60 | $H_2SO_4$ | 85 | 14.0 | 4.0 | 13.5 |
| 7 | 60 | $H_2SO_4$ | 85 | 14.0 | 4.0 | 18.5 |
| 8 | 60 | $H_2SO_4$ | 85 | 14.0 | 4.0 | 30.9 |
| 9 | 60 | $H_2SO_4$ | 85 | 14.0 | 4.0 | 12.0 |
| 10 | 60 | $H_2SO_4$ | 85 | 14.0 | 4.0 | 15.3 |

[1]Based on the N-vinylformamide units in the copolymer

We claim:
1. A process for preparation of a finely divided, water-soluble polymer containing vinylamine units wherein not less 30% strength by weight aqueous monomer solutions comprising
    (a) N-vinylformamide or without

(b) other water-soluble monoethylenically unsaturated monomers and with/or without (c) water-insoluble monoethylenically unsaturated monomers are polymerized in a first step in kneader in the presence of a polymerization initiator to such an extent that the initially formed water-containing polymer gel disintegrates into fine particles and in a second step the finely divided polymer obtained in this manner is hydrolyzed in a kneader by the addition of an acid or a base to such an extent that not less than 0.1 mol % of the N-vinylformamide units present in the polymer hydrolyze to give vinylamine units.

2. A process as claimed in claim 1, wherein from 60 to 85% strength by weight aqueous monomer solutions are polymerized.

3. A process as claimed in claim 1 or 2, wherein up to 10% by weight of one or more surfactants are added before, during or after the polymerization.

4. A process as claimed in claim 1, wherein the finely divided, partially or completely hydrolyzed polymer is dusted or mixed with an inert pulverulent solid.

5. A process as claimed in claim 1, wherein the hydrolysis is carried out in the presence of an aldehyde acceptor.

6. A process as claimed in claim 5, wherein sodium sulfite,, sulfur dioxide, sodium dithionite, hydroxylamine, phenylhydrazine, hydrazine, urea, ethyleneurea, propyleneurea, melamine, guanidine, aminoguanidine or a mixture thereof is used as the aldehyde acceptor in an amount of from 0.1 to 10% by weight, based on the polymer.

7. A process as claimed in claim 1, wherein monomers (b) are monoethylenically unsaturated $C_3$-$C_8$ carboxylic acids in the form of free acids or completely or partially neutralized with alkali metal base or ammonia, acrylamide, methacrylamide, acrylamidopropanesulfonic acid, vinylsulfonic acid, vinylphosphonic acid, hydroxyalkyl acrylates, hydroxyalkyl methacrylates, alkylaminoalkyl acrylates and methacrylates, salts of these monomers with mineral acids or organic acids or the quaternization products of the basic acrylates and methacrylates with alkyl halides, dimethyl sulfate or diethyl sulfate, N-vinylpyrrolidone, vinylpyridinium salts, diallyldimethylammonium halides, or mixtures thereof.

8. A process according to claim 7, wherein monomers (b) are acrylamide or N-vinylpyrrolidone.

9. A process according to claim 1, wherein monomers (c) are acrylates, methacrylates, dimethyl maleate, dimethyl fumarate, dimethyl itaconate, acrylonitrile, methacrylonitrile, vinyl acetal, vinyl propionate, or mixtures thereof.

10. A process according to claim 9, wherein monomer (c) is vinyl acetate.

11. A process according to claim 1, wherein monomers (b) are acrylamide or N-vinylpyrrolidone, and monomer (c) is vinyl acetate.

* * * * *